Jan. 20, 1970     P. S. BALDWIN     3,490,232
SEAL, PARTICULARLY FOR A PISTON IN THE MASTER CYLINDER
OF A HYDRAULIC BRAKE SYSTEM
Filed July 27, 1967     2 Sheets-Sheet 1

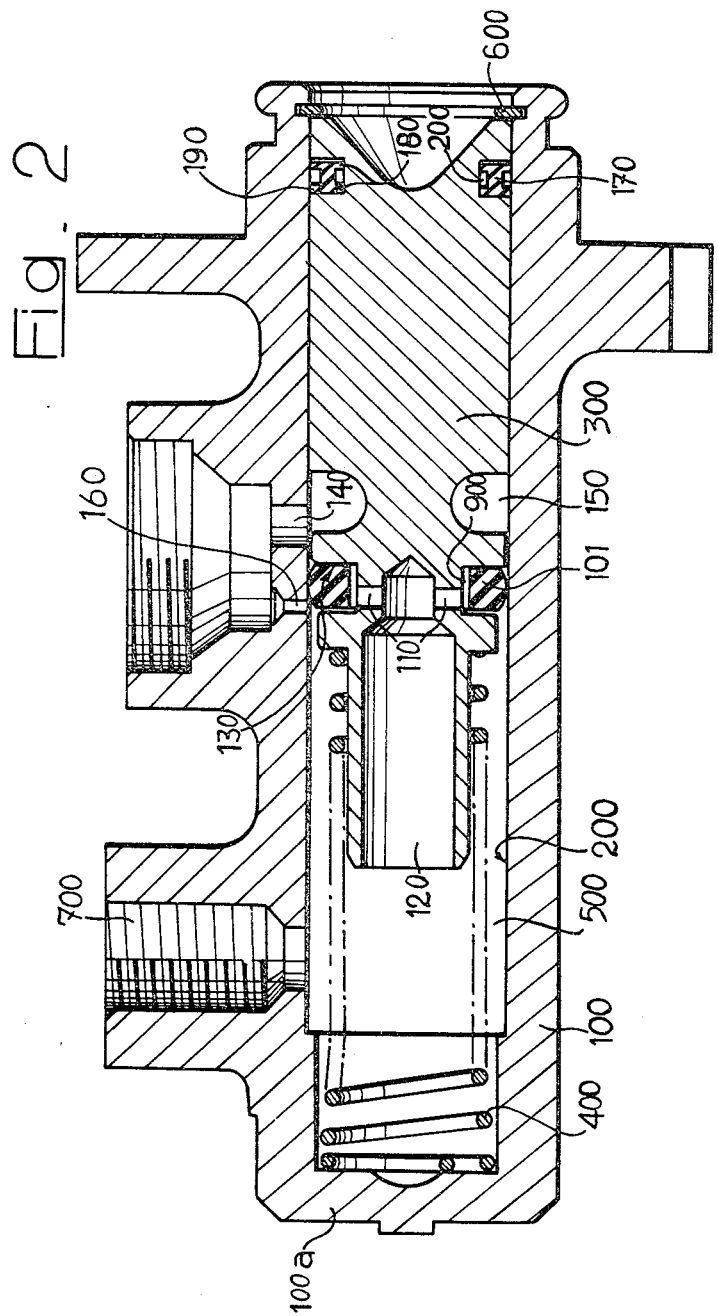

United States Patent Office 3,490,232
Patented Jan. 20, 1970

3,490,232
SEAL, PARTICULARLY FOR A PISTON IN THE MASTER CYLINDER OF A HYDRAULIC BRAKE SYSTEM
Philip Sidney Baldwin, Florence, Italy, assignor of one-half to Fiat Societa per Azioni, Turin, Italy
Filed July 27, 1967, Ser. No. 656,541
Claims priority, application Italy, Aug. 11, 1966, 775,075/66; Mar. 14, 1967, 50,921/67
Int. Cl. F15b 7/08; F16j 15/18, 9/08
U.S. Cl. 60—54.6                                7 Claims

ABSTRACT OF THE DISCLOSURE

The invention relates to seals which are particularly useful for sealing a piston in the master cylinder of a hydraulic brake system against the leakage of liquid from the master cylinder and the entry of atmospheric air into the master cylinder. The invention seeks to provide a seal which offers low frictional resistance and accordingly there is provided an annular seal which is of resilient material and provided with a pair of internal circumferential lips and a pair of external circumferential lips. The annular seal is thus in cross section substantially H-shaped. In accordance with preferred features of the invention the lips may be so shaped as to cause the external and internal circumferential grooves of the annular seal to be trapezoidal in cross section. The invention also provides a hydraulic brake system which incorporates such a seal mounted in various states of compression between a piston and a master cylinder bore wall.

---

Figure 1:
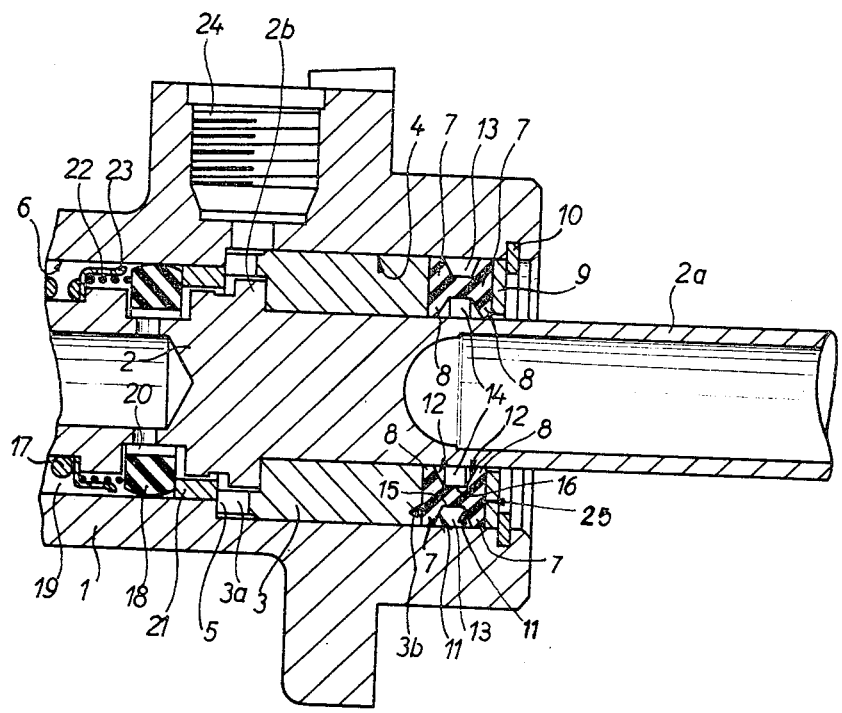

It is known that in the master cylinder of a hydraulic brake system, the piston should be sealed not only against the leakage of liquid from the master cylinder along the periphery of the said piston but also, under some circumstances, against the suction of air from the atmosphere into the said master cylinder.

In some known master cylinders of the type considered herein, sealing members of circular cross section are used and the necessary degree of sealing is achieved at the expense of some loss in the freedom for axial displacement afforded the piston. However, very substantial freedom for axial displacement is essential if the piston is to return to its starting or inoperative position under the action of a return or reaction spring after each working stroke.

It is an object of the present invention to provide an improved seal, particularly for the purpose referred to.

According to these and other objects, the present invention consists in a seal particularly for a piston in the master cylinder of a hydraulic brake system, wherein the seal is of annular form, made of resilient material and provided with a pair of internal and a pair of external circumferential lips, the seal being in cross section substantially H-shaped.

Advantageously, the seal presents planar annular surfaces perpendicular to its axis.

Such a seal may be used where is is required to effect sealing around the portion of a plunger piston which extends rearwardly from the master cylinder of a hydraulic brake system.

Accordingly, the invention also consists in a hydraulic brake system including a master cylinder and plunger piston slidable therein, a seal of the abovementioned type and according to the present invention being interposed between the internal wall of the master cylinder and that portion of the plunger piston which extends rearwardly from a guide bushing arranged within the said bushing and a thrust washer retained within the master cylinder. In this way, the seal is compressed accurately in register against the bushing and washer, its two opposite annular faces accurately resting respectively thereagainst, whereby the plunger piston is axially guided with respect to the seal, which latter of course remains stationary with respect to the cylinder.

A seal according to the present invention can also advantageously be employed for sealing against the leakage of liquid from the master cylinder, or the suction of outer air into the said cylinder, even where the master cylinder has slidably mounted therein a conventional piston instead of a plunger piston, the rear portion of which conventional piston positioned opposite the compression chamber is mounted with a slight clearance with respect to the cylinder bore.

Thus, the invention also consists in a hydraulic brake system including a master cylinder and a conventional piston slidable therein, a seal according to the invention being accommodated by a groove of rectangular cross section formed in the circumference of the rear end of the piston and so proportioned as to be slightly compressed in a radial direction after assembly with the piston in the bore of the master cylinder and to be simultaneously provided with a certain axial clearance within the said annular groove.

These and other objects and advantages of the invention will be clear from the following description, given with reference to the accompanying drawings which are by way of example and in which:

FIG. 1 is a longitudinal sectional view of the rear portion of the master cylinder of a hydraulic brake system, in which a cylinder plunger piston provided with a seal according to the invention is displaceably mounted; and FIG. 2 shows in similar section a further possible use for a seal according to the invention also in association with a master cylinder of a hydraulic brake system.

As shown in FIG. 1 of the drawings, a plunger piston 2 is slidably mounted in the master cylinder 1, the piston having its rear constant diameter portion 2a guided within a metal bushing 3 which is arranged within the large diameter rear portion 4 of the bore of the cylinder 1. The bushing 3 bears, by an axial annular projection 3a, on a radial annular shoulder 5 of the cylinder, which shoulder delimits the large diameter bore portion 4 with respect to the main and smaller diameter portion 6 of the bore of the cylinder 1.

A part of the portion 2a of the plunger piston 2 extends from the bushing 3 and this part of the portion 2a has fitted thereon an annular seal 25 according to the present invention. This seal 25 is made of resilient material, for instance rubber, and is provided with an external pair 7 and an internal pair 8 of annular lips. In cross section the material of the said seal has a substantially H shape with two legs joined by a cross piece. As illustrated, a lip 7 and a lip 8 together form one such leg while the other lip 7 and the other lip 8 together form the other said leg. The seal 25 is fitted in axial compression between the rear radial end wall 3b of the bushing 3 remote from the projection 3a and an annular washer 9 which is retained within the bore of the cylinder 1 by a split ring 10 received by a groove formed in the wall of the bore portion 4.

The external lips 7 of the annular seal 25 bear against the inner wall of the bore portion 4 and the internal lips 8 thereof bear against the outer circumference of the portion 2a of the plunger piston 2. The construction and dimensions of the seal are such as to ensure that it presents, to the end wall 3b of the bushing 3 and to the washer 9, planar annular surfaces perpendicular to the seal axis. Moreover, before mounting of the seal in the cylinder, the outer diameter of the external lips 7 of the said seal slightly exceeds the inner diameter of the bore portion 4, whereas the inner diameter of the internal lips 8 is slightly less than the outer diameter of the portion 2a of the plunger piston 2.

Furthermore, the lips 7, 8 are respectively so shaped as to form the side walls 11, 12, respectively, of an external circumferential groove 13 and of an internal circumferential groove 14 in the seal. These two grooves are each trapezoidal in cross section because the said side walls 11, 12, diverge outwardly from cylindrical bottom walls 15, 16, respectively. These bottom walls are concentric with, and equal in size to each other, their edges situated in the same radial planes, but the internal circumferential groove 14 is wider at its mouth than the external circumferential groove 13 because the side walls 12 diverge by a larger extent than the side walls 11.

The groove 14 may conveniently be filled with grease in order to lubricate the portion 2a of the plunger piston 2, whereby friction between the said portion 2a and the circumferential surfaces of the internal lips 8 of the seal is further reduced. Irrespective of such lubrication, however, this friction is in accordance with the benefits of the invention always very slight, this being so even with a high degree of axial compression of the seal, even in the order of 1 mm.

This low frictional resistance between the plunger piston 2 and seal 25 ensures a ready return of the said plunger piston, under the action of a reaction spring 17, to the starting or inoperative position shown in FIG. 1, after each working stroke.

In this starting position a radial annular projection 2b provided on the plunger piston 2 bears against the bushing 3. Similarly, a valve ring 18, slidable in the small diameter bore portion 6 of the cylinder 1 and received with axial and radial clearance by a circumferential annular groove 20 formed in the piston 2, is displaced by the action of a stiff or thrust ring 21 which bears against the internal portion of the axial projection 3a of the bushing 3. This is in opposition to the action of a coil spring 22 which bears against a washer 23 held by the said reaction spring 17. The described position of the ring 18 establishes interconnection of a cylinder chamber 19 and connecting pipe 24 which latter leads via a suitable conduit to a reservoir (not shown). Such parts of the master cylinder are however known per se and are not a part of the present invention, having been shown solely to exemplify more clearly an advantageous arrangement incorporating a seal according to the present invention.

Various modifications of the invention are of course possible within the scope of the appended claims, and a modified use for a seal according to the invention is illustrated in FIG. 2 of the drawings. In this figure there is shown a master cylinder 100 which is open at one end and closed at its other end by a wall 100a. A monolithic piston 300 is slidably mounted in the bore 200 of the cylinder 100 and the piston 300 is normally urged, by a reaction spring 400 seated within a compression chamber 500, against an expansible stop ring 600 which is received in a groove formed in the cylinder inner wall in proximity of the cylinder open end.

The compression chamber 500 connects with an outlet opening 700 which is itself connectable by conduits (not shown) to wheel brake cylinders.

The piston portion facing the chamber 500 is formed with an annular groove 900 which accommodates, with an axial and radial clearance, a valve ring or annular sealing member 101, the outer circumference of which sealing member 101 is of arcuate cross section and constantly contacts the cylinder inner wall. The bottom of the groove 900 connects, via radial holes 110 and an axial conduit 120, with the compression chamber 500. The groove 900 is also connectable with an opening 140 itself connectable with a reservoir (not shown), connection of the groove 900 and opening 140 is via a channel formed when the sealing member 101 is withdrawn from the groove 900 wall at 130 and via the peripheral clearance which exits between the grooved piston portion and the cylinder inner wall.

An annular groove 150 is formed in the piston body opposite the opening 140 and is adapted to interconnect the compression chamber 500 and opening 140 during the return stroke of the piston at the end of each braking step. A compensation hole 160 in turn effects compensation of the pressures in the compression chamber and reservoir after return of the piston to its initial position.

According to the present invention the leakage of liquid from the cylinder and the suction of outer air into the cylinder, are prevented by the provision of an annular seal 170 which is made of resilient material, for instance rubber, with pairs of radial internal and external lips 180, 190, respectively. The seal 170 is seated in an annular groove 200 formed in the rear piston portion, slightly spaced from that piston end which bears in the inoperative position of the piston and cylinder on the expansible stop ring 600.

Also in accordance with the invention the seal 170 is so shaped as to be slightly compressed in a radial direction after assembly with the piston 300 within the cylinder and to be mounted within the annular groove 200 with a certain axial clearance.

What is claimed is:

1. A seal particularly for a piston in the master cylinder of a hydraulic brake system wherein said seal is of annular form and made of resilient material, said seal being provided with a pair of internal and a pair of external radially extending circumferential lips, to define a seal that is substantially H-shaped in cross-section, said external lips and said internal lips being so shaped as to form respectively the side walls of an external circumferential groove and an internal circumferential groove with said side walls being inclined with respect to each other and diverging away from the respective groove base, whereby the said annular grooves are trapezoidal in cross-section.

2. Seal as claimed in claim 1, wherein the said groove bases are equal in axial length and have their opposite edges situated in the same radial planes of the seal.

3. Seal as claimed in claim 1, wherein the inclination of the side walls of the groove formed in the inner circumference of the seal with respect to the axis of the said seal is greater than the inclination with respect to the same axis of the side walls of the groove formed in the outer circumference of the said seal.

4. A seal for a piston in the master cylinder of a hydraulic brake system which includes a master cylinder, a plunger piston slidable therein, a guide bushing and a thrust washer, wherein said seal is of annular form, made of resilient material and provided with a pair of internal and a pair of external circumferential lips, the seal being substantially H-shaped in cross-section and interposed between the internal wall of the master cylinder and that portion of the plunger piston which extends backwardly from the said guide bushing when arranged within the said master cylinder, the said seal being axially compressed between the said bushing and the said thrust washer which latter is retained within the bore of the said master cylinder.

5. System as claimed in claim 4, wherein the seal is so dimensioned that the diameter of the external lips is slightly larger than the bore of the master cylinder prior to mounting therein and the diameter of the internal lips is slightly smaller than the outer diameter of the plunger piston before mounting thereon, the said seal being in use compressed between the said master cylinder and plunger piston.

6. A seal particularly for a piston in the master cylinder of a hydraulic brake system wherein said seal is of annular form and made of resilient material, said seal being provided with a pair of internal and a pair of external radially extending circumferential lips, the outermost surfaces of which define parallel planar surfaces perpendicular to the axis of said seal to define a seal that is substantially H-shaped in cross-section.

7. A hydraulic brake system including a master cylinder and a conventional piston slidable therein, the system comprising a seal of annular form and made of resilient material, said seal being provided with a pair of internal and a pair of external radially extending circumferential lips, the outermost surfaces of which define a pair of parallel planar surfaces perpendicular to the axis of said seal to define a seal that is substantially H-shaped in cross-section, said seal being accommodated by a groove of rectangular cross-sections formed in the circumference of the rear end of said piston and so proportioned as to be slightly compressed in a radial direction after assembly with the piston in the bore of the master cylinder and to be simultaneously provided with a certain axial clearance within said annular groove.

References Cited

UNITED STATES PATENTS

| | | | |
|---|---|---|---|
| 439,902 | 11/1890 | Sharon | 277—206 XR |
| 1,924,020 | 8/1933 | Bihet | 277—206 XR |
| 1,721,325 | 7/1929 | Wilson | 277—206.1 XR |
| 2,255,259 | 9/1941 | Loweke | 60—54.6 |
| 3,183,008 | 5/1965 | Yost | 277—206.1 XR |
| 3,357,182 | 12/1967 | Jacoby | 60—54.6 |
| 2,000,187 | 5/1935 | Oliver | 60—54.6 |
| 2,208,620 | 7/1940 | Baisch. | |
| 3,307,667 | 3/1967 | Maurice | 60—54.6 XR |

MARTIN P. SCHWADRON, Primary Examiner

ROBERT R. BUNEVICH, Assistant Examiner

U.S. Cl. X.R.

92—168; 277—206